United States Patent

[15] 3,667,305

Rasoira

[45] June 6, 1972

[54] MACHINE TOOL HAVING A ROTARY WORKTABLE

[72] Inventor: Michelangelo Rasoira, Ivrea, Italy

[73] Assignee: Ing. C. Olivetti & C., S.p.A., Ivrea (Torino), Italy

[22] Filed: June 18, 1970

[21] Appl. No.: 47,319

[30] Foreign Application Priority Data

June 21, 1969 Italy..................52334-A/69

[52] U.S. Cl..................74/818, 29/1 A, 74/813 L, 74/824
[51] Int. Cl.................................................B23b 29/32
[58] Field of Search..............74/826, 824, 822, 821, 818, 74/817, 816, 813 L, 813 R; 29/1 A; 90/56

[56] References Cited

UNITED STATES PATENTS 2,952,168  9/1960  Leifer..........................74/822 X
2,975,657  3/1961  Samuel.........................74/826 X Primary Examiner—William F. O'Dea
Assistant Examiner—F. D. Shoemaker
Attorney—Birch, Swindler, McKie & Beckett

[57] ABSTRACT

A machine tool having a rotary work-table driven in rotation by a circular gear carried by the work-table cooperating with a worm gear and drive mechanism mounted on the work-table support. The underside of the work-table bears upon a slideway. The work-table is locked to the slideway by means of three equidistant posts biased into clamping relationship with a slot in the slideway. An annular piston operates a linkage that engages the posts, and upon actuation of the piston the posts are moved to a position spaced from the slot to unlock the work-table for rotation. The annular piston also moves a plurality of bearings into engagement with the underside of the work-table to remove the full load thereof from the slideway to facilitate rotation.

9 Claims, 4 Drawing Figures

INVENTOR
MICHELANGELO RASOIRA

INVENTOR.
MICHELANGELO RASOIRA 3,667,305

MACHINE TOOL HAVING A ROTARY WORKTABLE

CROSS REFERENCE TO RELATED APPLICATION

Applicant claims priority from the corresponding Italian Pat. application, Ser. No. 52334-A/69, filed June 21, 1969.

BACKGROUND OF THE INVENTION

Field of the Invention

The present invention relates to a machine tool with a rotary work-table.

There are known various machine tools of the aforesaid type in which the rotary table is normally immobilized relative to the support by a coupling having frontal dogs. To rotate the table it is first disengaged by means of a hydraulically operated lifting action and is then rotated by means of a pinion meshing with a gear fixed to the table itself. The table can therefore be given a discrete angular positioning at distances which are multiples of the pitch of the dogs of the coupling, for which reason continuous rotation is not possible.

SUMMARY OF THE INVENTION

The present invention provides a machine tool with a rotary work-table which has a plane annular surface bearing on an annular slideway fixed to a support and normally kept clamped against the slideway by a series of elements biased by independent springs, a self-equalizing hydraulic system being provided for effecting simultaneous release of all the clamping elements.

A preferred embodiment of the invention is illustrated by way of example by the following description and the accompanying drawings.

DETAILED DESCRIPTION OF THE INVENTION

Figure 1:
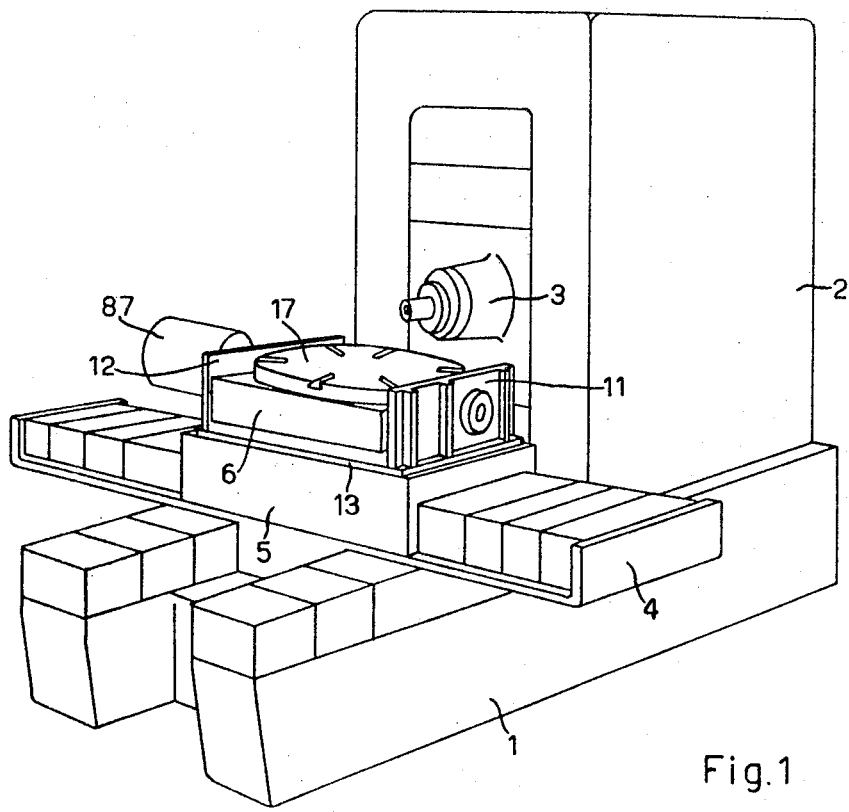
FIG. 1 is a perspective view of a machine tool with a rotary work-table.

Referring to FIG. 1, the machine tool includes a bed 1 to which there is fixed a standard 2 carrying a rotary spindle 3. The spindle is carried by a slide movable vertically under the command of a numerical control system (not shown). A slide 4 is slidable on the bed 1 in a direction parallel to the axis of the spindle 3 under numerical control and a second slide 5 is slidable on the slide 4 in a direction perpendicular to that in which the slide 4 moves, also under the numerical control.

Figure 2:
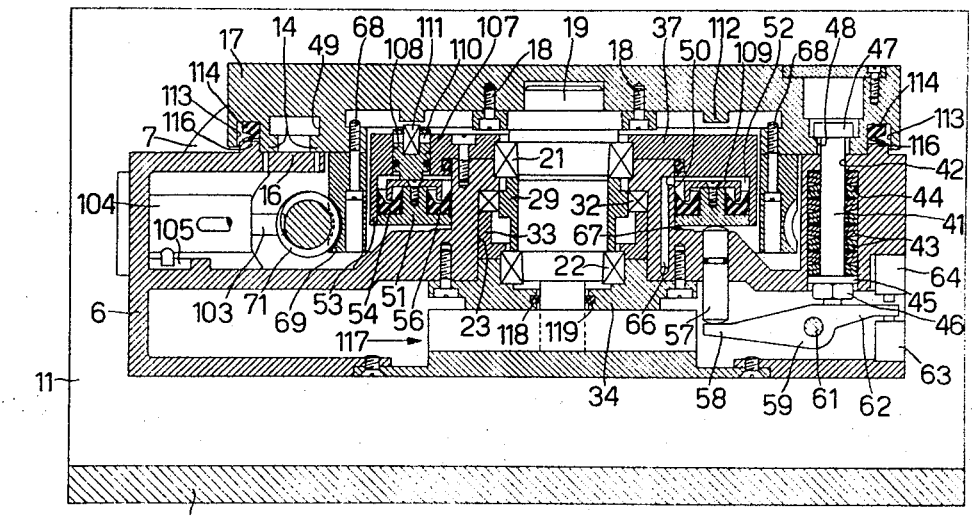
FIG. 2 is a longitudinal section of the rotary table.
Figure 3:
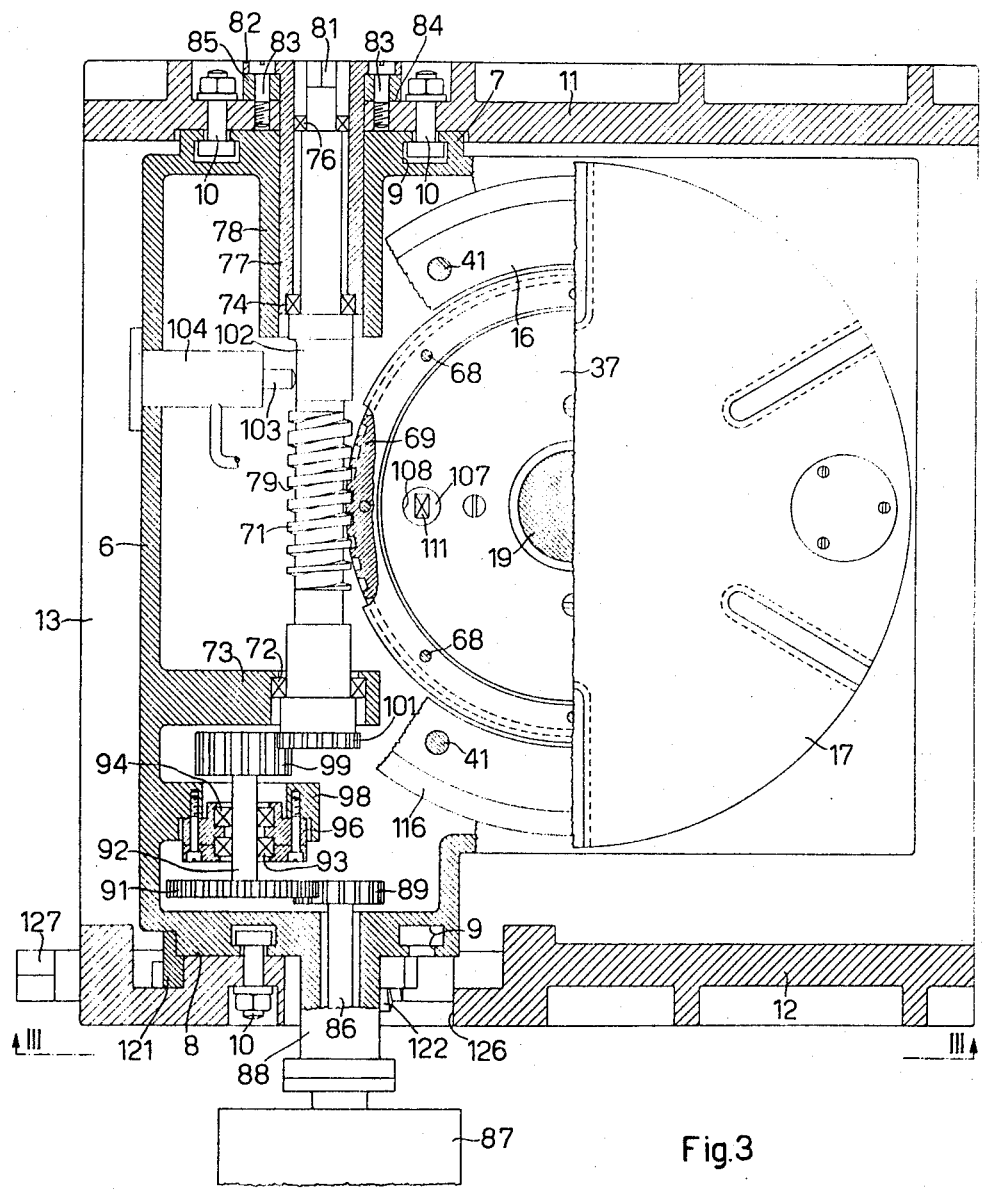
FIG. 3 is a plan view, partly in section, of the arrangement of FIG. 2.

On the slide 5 there is mounted a support 6 (FIG. 2) for the rotary table 17, which support has a substantially parallelepipedal form. Two opposite sides of the support 6 are provided with two coaxial flanges 7 and 8 (FIG. 3) in each of which there is formed a circular slot 9 of a T-shaped cross-section in which fixing bolts 10 are housed. By means of these bolts, the support or frame 6 is fixed to two uprights 11 and 12 which are parallel to one another and are carried by a horizontal plate 13 of the slide 5.

The support 6 (FIG. 2) is provided with an annular slideway 16 on which there bears a plane annular surface 14 of the work-table 17. The work-table 17 is connected by means of screws 18 to a shaft 19 which is rotatable in two taper roller bearings 21 and 22 in a hub 23 integral with the frame 6. Between the bearings 21 and 22 there is interposed a spacing bush 29 on to which another bearing 32 is driven. A spacing ring 33 is interposed between the bearing 32 and a flange 34 fixed to the support 6.

Normally, thw work-table 17 is kept clamped to the slide 16 by an arrangement comprising three posts 41 disposed at 120° from each other and engaged in an equal number of bores 42 formed in the slideway 16. On each post 41 there is mounted a stack of Belleville springs 43 housed in a corresponding bore 44 in the support 6 and compressed between the top end of the bore itself and a washer 45 fixed to the post 41 by means of a nut 46. Each post 41 has a flange 47 adapted to engage a shoulder 48 of an annular slot 49 of T-shaped cross-section. The slot 49 is formed in the work-table 17 in correspondence with the surface 14. The springs 43 therefore hold the flanges 47 against the shoulder 48 and the work-table 17 is clamped.

For releasing the table, there is provided a hydraulic system including an annular piston 51 housed in an annular space 52 defined by a cylindrical wall 50 of the support 6, a cylindrical wall 53 of a flange 37 fixed to the support 6 and the base of the flange 37 itself. Oil seats are provided by means of the rubber rings 54 and 56. A pump not shown in the drawings delivers oil under pressure to the annular space 52 through a duct 66. The piston 51 bears on three pins 57 each disposed in correspondence with the posts 41. Each pin 57 co-operates with an arm 58 of a lever 59 pivoted at 61 and having a second arm 62 bearing against the lower end of the corresponding post 41. The end of one of the arms 62 moreover co-operates with two microswitches 63 and 64 fixed to the support 6. The microswitch 63 is adapted to signal when the work-table 17 is clamped, while the microswitch 64 is adapted to signal when the work-table 17 is released and free to rotate.

A helical gear 69 is fixed to the work-table 17 by means of screws 68. This gear meshes with a worm 71 (FIG. 3) rotatable in a ball bearing 72 in a plate 73 integral with the support 6 and in two ball bearings 74 and 76 in a sleeve 77 received in a sleeve 78 integral with the flange 7 of the support 6. The worm 71 is of varying pitch, inasmuch as one side 79 of the thread has an inclination different to that of the other side. The thickness of the thread therefore gradually becomes different, increasing from bottom to top in FIG. 3. Moreover, the worm 71 has a square end 81 on which a spanner can be fitted for manual rotation of the worm 71.

The sleeve 77 has a flange 82 by means of which it is fixed by screws 83 to a seat 84 on the upright 11. Between the flange 82 and the seat 84 there is interposed a spacing ring 85, by changing which it is possible to shift the worm 71 axially to effect complete taking-up of the play between the worm and the helical gear 69. By reducing the thickness of the ring 85, the worm 71 is shifted axially downwards in FIG. 3, and co-operates with the helical gear 69 by means of a thread of greater thickness, thus taking up the play due to wear.

The rotation of the worm 71 is controlled by a shaft 86 of a reversible electric motor 87 fixed to a sleeve 88 integral with the flange 8 of the support 6. On the shaft 86 there is fixed a pinion 89 in mesh with a gear 91 fast with a shaft 92. This shaft is rotatable in two ball bearings 93 and 94 in a collar 96 fixed to a projection 98 of the support 6. On the shaft 92 there is fixed a second gear 99 which meshes with a pinion 101 fast with the worm 71. The gear 99 has a width such as to permit a certain axial displacement of the worm 71 to permit the adjustment thereof for taking up play.

An eccentric 102 is integral with the worm 71 and is adapted to co-operate during the rotation of the latter with the plunger 103 of a plunger pump 104 fixed in the frame 6. The pump 104 delivers oil to suitable ducts (not shown in the drawings) for lubricating the slideway 16 on which the work-table 17 (FIG. 2) rotates. After the oil has lubricated the slide 16, it returns to a sump 105 to be sucked up again by the pump 104.

During the rotation of the work-table 17 on the guides 16 there is great friction in spite of the oil lubrication. In order to reduce this friction, there are provided three small pistons 107 disposed at 120° from each other and housed in a equal number of cylinders 108 formed in the flange 37 and in communication with the space 52. Normally, the pistons 107 bear on a U-shaped ring fixed to the piston 51 to retain the sealing rings 54 and 56 thereon. Each piston 107 houses a ball bearing 111 rotatable about a pin 110 and adapted to co-operate with a second annular surface 112 of the table 17.

In order to prevent the cutting oil with other possible impurities from penetrating and passing on the guides 16 during the machining of the workpieces, the work-table 17 has formed therein a seat 113 adapted to accommodate a sealing ring 114 co-operating with a circular rim 116 of the frame 6.

For controlling the precision of the angular movements of the work-table 17 there is provided a transducer or angular position detector indicated generally by the reference 117, which is accommodated below the flange 34 concentrically with the shaft 19 and substantially of the type illustrated in the specification of our U.S. Pat. No. 3,596,222. In order to prevent oil reaching the transducer 117, the flange 34 has formed therein a seat 118 adapted to housed a sealing ring 119 which co-operates with the shaft 19.

Figure 4:
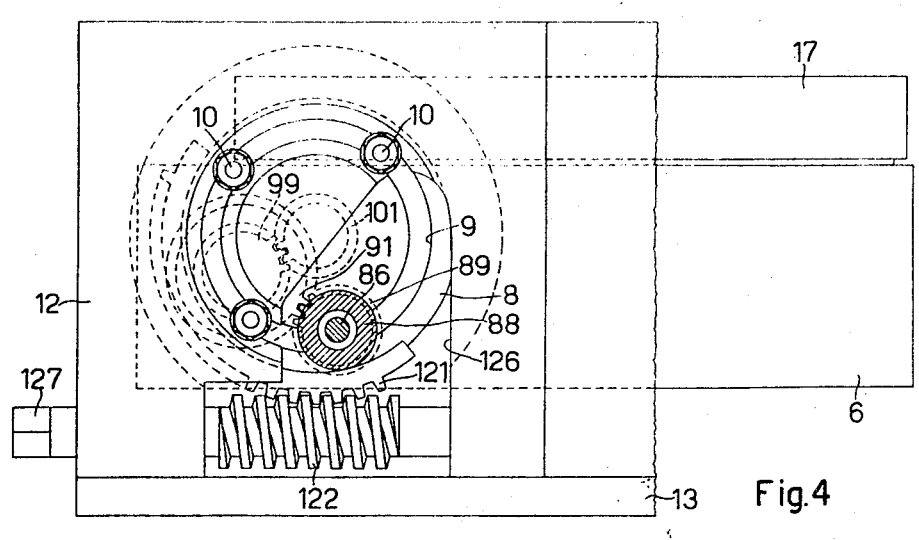
FIG. 4 is a partial view on the line III-III of FIG. 3.

The work-table 17 may be arranged to operate horizontally, as shown in FIG. 4, or may be arranged to operate vertically. To this end, a toothed sector 121 coaxial with the worm 71 is fixed to the flange 8 of the support 6. The sector 121 meshes with a worm 122 rotatable in the upright 12. A suitably shaped opening 126 is formed in the upright 12 so as to permit the housing of the worm 122 and the rotation of the sleeve 88 and the motor 87 about the axis of the worm 71.

The machine tool thus described operates in the following manner.

The work-table 17 (FIG. 2) is normally clamped against the slide 16 by the pressure of the springs 43, which hold the flanges 47 of the respective posts 41 against the shoulder 48 of the table. Assume that the work-table 17 must be shifted from a first setting to a second setting with respect to a reference point and that the workpiece to be machined is fixed to the table 17. The programmed command and numerical control system causes the pump not shown in the drawings to be actuated and the pump delivers oil under pressure through the duct 66 to the space 52 and, therefore, also to the cylinders 108.

On the one hand, the annular piston 51 is lowered and pushes the three pins 57 downwardly until it is arrested against the shoulder 67. As the pins 57 are depressed, they cause the respective levers 59 to rotate. Each lever raises the respective post 41 by means of the arm 62, overcoming the action of the springs 43. If, at any instant, the three posts 41 require different forces or different strokes to overcome the springs 43, the single annular space 52 equalizes or balances these forces, thus effecting the simultaneous release of the table 17 at all the posts 41. The end of the arm 62 of the lever shown in FIG. 2 then opens the microswitch 63 and closes the microswitch 64, the switches signalling that the work-table 17 is released.

Simultaneously with the lowering of the piston 51, the oil under pressure in the cylinders 108 raises the three pistons 107, which bring their respective ball bearings 111 to bear against the surface 112 of the work-table 17, thus relieving the pressure of the surface 14 on the slide 16 and therefore greatly reducing the friction thereof without, however, shifting the table itself.

Thereafter, the motor 87 (FIG. 3) begins to revolve and, through the gears 89, 91, 99, and 101, causes the worm 71, the helical gear 69 and the work-table 17 to rotate. The pump 104, operated by the eccentric 102, delivers oil for lubrication between the slideway 16 (FIG. 2) and the surface 14.

The position transducer 117 signals the continuous position of the table 17 to the numerical control apparatus. At the predetermined second setting, the numerical control apparatus commands the arrest of the motor 87, as a result of which the table stops. Thereafter, the pump delivering oil under pressure is stopped and the springs 43 bring the respective posts 41 back to the initial position, causing the levers 59 to return and bringing the pins 57 and the piston 51 back to the inoperative position. The end of the arm 62 of the lever 59 opens the microswitch 64 and closes the microswitch 63. Also, the three pistons 107 relieve their pressure on the respective bearing 111, as a result of which the work-table is clamped again.

If the machining carried out on the workpiece requires a continuous rotation of the work-table 17, for example for producing given profiles, the pump keeps oil under pressure continuously both in the space 52 and in the cylinders 108 and the work-table 17 remains continuously released. The motor 87, in turn, rotates continuously under the command of the numerical control apparatus and, through the worm 71, causes the work-table 17 to rotate at the desired speed and in the desired sense.

In order to effect the tilting or upending of the table, for example for carrying out machining operations on inclined or vertical surfaces of the workpiece, the nuts of the bolts 10 (FIG. 3 and 4) which keep the support 6 fixed to the uprights 11 and 12 are first unscrewed. A spanner or handle is then placed on the square end 127 of the worm 122 and the worm 122 is turned manually. Through the sector 121, the worm causes the support 6 to rotate together with the table 17 about the axis of the flanges 7 and 8 and, therefore, about the axis of the worm 71, until the desired position is reached. Finally, the nuts of the bolts 10 are tightened again, thus again fixing the support 6 to the uprights 11 and 12. The table 17 can now be rotated in its new position in the manner seen hereinbefore to assume any angular position around its own axis.

What I claim is:

1. A machine tool having a rotary work-table, a support for said work-table, wherein the improvement comprises:
   an annular slideway fixed to said support,
   a plane annular surface on said table for bearing on said slideway,
   a series of clamping elements mounted on said support and biased to normally keep said surface clamped against slideway, and
   a self-equalizing hydraulic system for effecting simultaneous release of all said clamping elements.

2. A machine tool according to claim 1, wherein each one of said clamping element is constituted by a post located equidistant around said table comprising:
   an annular slot in said surface, each of said posts extending through said slot, and
   a flange on each of said posts retained in a widened portion of said slot.

3. A Machine tool according to claim 2, comprising:
   a stack of Belleville springs disposed in said support to bias each one of said posts, and
   a single annular piston comprised in said system and acting on said posts through intermediate means.

4. A machine tool according to claim 3, comprising:
   a second annular surface on said table,
   a set of cylindrical pistons comprised in said systems, and
   a set of rolling bearings each one mounted on a corresponding one of said cylindrical pistons and movable therewith to bear against said second surface during the actuation of said annular piston without shifting said table, 5. A machine tool according to claim 4, comprising:
   a first cylinder for said annular piston,
   a set of further cylinders for each one of said cylindrical pistons, and
   communicating ducts between said first cylinder and said further cylinders to cause said cylindrical pistons to move in the direction opposite to that of said annular piston, said intermediate means comprising:
   a series of pins each disposed in correspondence with one of said posts and cooperating with said annular pistons,
   a series of levers each co-operating with one of said pins,
   said annular piston acting on said posts through said pins and said levers, and
   a pair of microswitches for defining the clamped and released conditions of said table and actuatable by one of said levers in its extreme positions.

6. A machine tool according to claim 1, comprising
   a spindle rotatable around a horizontal axis,
   a slide carrying said support and slidably horizontally on the machine frame,
   a helical gear sector fixed to said support,
   a worm rotatable on said slide, and means for rotating said worm to tilt said support about an axis perpendicular to the axis of rotation of said table and to the axis of said spindle.

7. A machine tool according to claim 1, comprising:
a helical gear fixed to said table,
a worm rotatably mounted on said support and engaging said helical gear, and
control means for rotating said worm to command both discrete rotations and continuous rotations of said table, said control means comprising an angular position detector disposed coaxially with said table.

8. A machine tool according to claim 7, wherein said worm has progressively varying pitch, comprising:
a projection on said support rotatably mounting one end of said worm,
a flange on said support,
a sleeve inserted and guided in said flange and rotatably mounting the other end of said worm, and
a spacing ring removably interposed between said sleeve and said support, and whereby by interchanging said ring with one of different thickness an axial shifting of said worm is caused to completely take up any play existing between said worm and said helical gear.

9. A machine tool according to claim 7, comprising:
a further helical gear sector fixed to said support,
a further worm rotatable on said slide, and
means for rotating said further worm to tilt said support about an axis perpendicular to the axis of rotation of said table and to the axis of said spindle, the tilting axis of said support being coincident with the axis of said first named worm.

* * * * *